(12) United States Patent
Lee et al.

(10) Patent No.: US 9,065,712 B2
(45) Date of Patent: Jun. 23, 2015

(54) METHOD AND APPARATUS FOR TRANSMITTING/RECEIVING DATA IN A WIRELESS COMMUNICATION SYSTEM

(75) Inventors: Moon Il Lee, Anyang-si (KR); Ja Ho Koo, Anyang-si (KR); Jae Hoon Chung, Anyang-si (JP); Bin Chul Ihm, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 338 days.

(21) Appl. No.: 13/266,833

(22) PCT Filed: Apr. 27, 2010

(86) PCT No.: PCT/KR2010/002643
§ 371 (c)(1),
(2), (4) Date: Oct. 28, 2011

(87) PCT Pub. No.: WO2010/126280
PCT Pub. Date: Nov. 4, 2010

(65) Prior Publication Data
US 2012/0039292 A1    Feb. 16, 2012

Related U.S. Application Data

(60) Provisional application No. 61/174,125, filed on Apr. 30, 2009.

(30) Foreign Application Priority Data

Apr. 26, 2010    (KR) .................... 10-2010-0038353

(51) Int. Cl.
*H04W 4/00*    (2009.01)
*H04L 27/26*    (2006.01)
(Continued)

(52) U.S. Cl.
CPC ........ *H04L 27/2607* (2013.01); *H04L 27/2602* (2013.01); *H04W 72/0413* (2013.01); *H04W 28/06* (2013.01)

(58) Field of Classification Search
CPC ............ H04L 27/2602; H04L 27/2605; H04L 27/2607; H04L 27/2678; H04L 27/2666; H04W 72/0406; H04W 28/06; H04W 28/0413
USPC ......... 370/208, 210, 260, 312, 329, 331, 336, 370/252, 277, 278, 341, 342, 350; 375/260, 375/261
See application file for complete search history.

(56) References Cited

U.S. PATENT DOCUMENTS 7,599,327 B2 *  10/2009  Zhuang ......................... 370/329
7,804,765 B2 *   9/2010  Tzannes et al. ............... 370/210
(Continued)

FOREIGN PATENT DOCUMENTS

JP      2009-027677         2/2009
WO     WO 2007123340    * 11/2007
(Continued)

*Primary Examiner* — Kwang B Yao
*Assistant Examiner* — Harun Chowdhury
(74) *Attorney, Agent, or Firm* — Morgan, Lewis & Bockius LLP (57) ABSTRACT

The present invention relates to a method and apparatus for transmitting/receiving data in a wireless communication system. According to one aspect of the present invention, a data receiving method is provided wherein a mobile station in a wireless communication system uses a frame including a first subframe in which a physical downlink shared channel (hereinafter, referred to as "PDSCH") includes a first cyclic prefix (hereinafter, referred to as "CP") and a second subframe in which the PDSCH includes a second CP, wherein the data receiving method comprises a step in which the mobile station receives information on the length of the first CP from a base station, receives data from the base station through the first subframe, and removes the CP of the data using the information on the length of the first CP. The first CP and the second CP have different lengths.

6 Claims, 5 Drawing Sheets

(51) Int. Cl.
*H04W 72/04* (2009.01)
*H04W 28/06* (2009.01)

(56) References Cited

U.S. PATENT DOCUMENTS

| | | | | |
|---|---|---|---|---|
| 8,179,783 | B2* | 5/2012 | Cheng et al. | 370/208 |
| 8,457,226 | B2* | 6/2013 | Braithwaite | 375/260 |
| 2008/0084845 | A1* | 4/2008 | Kuchibhotla et al. | 370/331 |
| 2008/0273616 | A1* | 11/2008 | Papasakellariou | 375/260 |
| 2009/0019337 | A1 | 1/2009 | Pi et al. | |
| 2009/0097447 | A1 | 4/2009 | Han et al. | |
| 2009/0116421 | A1* | 5/2009 | Kawasaki | 370/312 |
| 2009/0116434 | A1* | 5/2009 | Lohr et al. | 370/329 |
| 2009/0122771 | A1* | 5/2009 | Cai | 370/338 |
| 2009/0296645 | A1* | 12/2009 | Bui | 370/329 |
| 2010/0002647 | A1 | 1/2010 | Ahn et al. | |
| 2010/0061258 | A1 | 3/2010 | Seo et al. | |
| 2010/0177697 | A1 | 7/2010 | Tanno et al. | |

FOREIGN PATENT DOCUMENTS

| | | |
|---|---|---|
| WO | 2008/054143 | 5/2008 |
| WO | 2009/022879 A2 | 2/2009 |

* cited by examiner

METHOD AND APPARATUS FOR TRANSMITTING/RECEIVING DATA IN A WIRELESS COMMUNICATION SYSTEM

This is a U.S. National Phase Entry of PCT Application No. PCT/KR2010/002643, filed Apr. 27, 2010, and claims the benefit of U.S. Provisional Application No. 61/174,125, filed Apr. 30, 2009. The present national stage application also claims the benefit of Korean Patent Application No. 10-2010-0038353, filed Apr. 26, 2010.

TECHNICAL FIELD

The present invention relates to a wireless communication system, and more particularly, to a method and apparatus for transmitting/receiving data in a wireless communication system.

BACKGROUND ART

Figure 1:
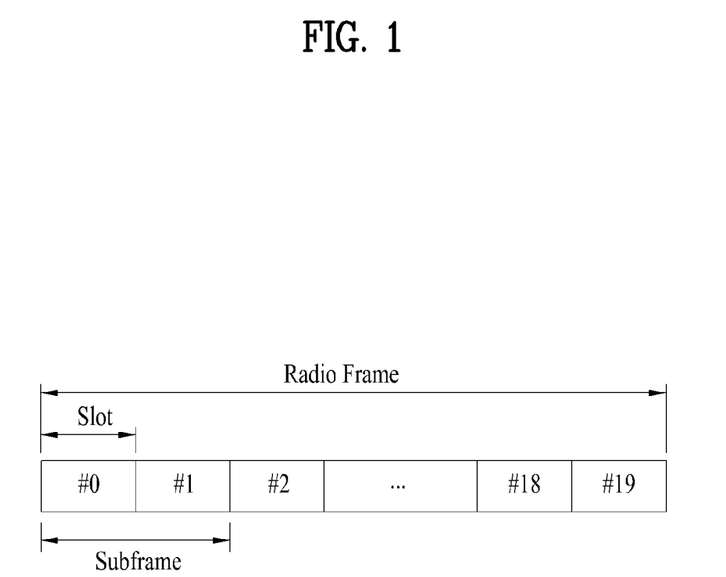
FIG. 1 is a diagram illustrating a frame structure of an LTE system.

First of all, a frame structure of a wireless communication system will be described with reference to FIG. 1. FIG. 1 is a diagram illustrating a frame structure of a long term evolution (LTE) system. As shown in FIG. 1, one frame includes ten subframes, each of which includes two slots. The time required to transmit one subframe will be referred to as a transmission time interval (hereinafter, referred to as "TTI"). For example, one subframe may be 1 ms, and one slot may be 0.5 ms.

One slot includes a plurality of orthogonal frequency division multiplexing (OFDM) symbols. The OFDM symbols may be referred to as SC-FDMA symbols or symbol duration.

One slot includes seven or six OFDM symbols in accordance with a length of cyclic prefix (hereinafter, referred to as "CP"). The LTE system includes a normal CP and an extended CP. One slot includes seven OFDM symbols if a normal CP is used, while one slot includes six OFDM symbols if an extended CP is used. The extended CP is used if delay spread is great.

In the wireless communication system, various types of subframes may be defined. For example, the LTE-A system may include Rel-8 subframes, relay subframes, multicast broadcast single frequency network (MBSFN) subframes and Rel-10 subframes.

The Rel-10 subframes may be regarded as the MBSFN frames to a Rel-8 mobile station, and a PDSCH of a Rel-10 mobile station may be transmitted through an MBSFN frame. A PDCCH structure is uniform regardless of types of subframes. A multicast channel uses the extended CP.

According to the related art, a CP length has been determined in accordance with a cell. For example, in case of a large-sized cell, since the distance between a base station and a mobile station may be long, the large-sized cell uses the extended CP, whereas a small-sized cell uses the normal CP. In other words, if a CP length is determined per cell, subframes in a frame of one cell use the CP of one length.

Even in case of the large-sized cell, since the mobile station located near the base station has small delay spread, it may transmit and receive data without any problem by using the normal CP. However, according to the related art, since the CP length is determined per cell, a problem occurs in that resource waste is caused due to the CP of the same length applied to subframes allocated to all the mobile stations within a cell.

DISCLOSURE

Technical Problem

As described above, according to the related art, a problem occurs in that resources have been wasted as a CP having one length determined per cell is used.

Accordingly, the present invention has been devised to obviate one or more problems due to limitations and disadvantages of the related art, and an object of the present invention is to provide a method for transmitting and receiving data to efficiently use resources.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, in a method for receiving data in a mobile station of a wireless communication system by using a frame including a first subframe in which a physical downlink shared channel (hereinafter, referred to as "PDSCH") includes a first cyclic prefix (hereinafter, referred to as "CP") and a second subframe in which the PDSCH includes a second CP, the method comprises the steps of receiving information on the length of the first CP from a base station; receiving the data from the base station through the first subframe; and removing a CP of the data using the information on the length of the first CP, wherein the first CP and the second CP have their respective lengths different from each other.

At this time, PDCCHs of all the subframes of the frame may have the same CP length.

Also, the mobile station may receive the information on the length of the first CP through a physical downlink control channel (PDCCH) of the first subframe.

Also, the mobile station may receive the information on the length of the CP of the subframes of the frame through a radio frame header of the frame.

Also, the first CP may be an extended CP if the mobile station has great delay spread.

To achieve these objects and other advantages and in accordance with the purpose of the invention, according to another aspect of the present invention, in a method for transmitting data from a base station of a wireless communication system by using a frame including a first subframe in which a physical downlink shared channel (hereinafter, referred to as "PDSCH") includes a first cyclic prefix (hereinafter, referred to as "CP") and a second subframe in which the PDSCH includes a second CP, the method comprises the steps of transmitting information on the length of the CP of the frame to a mobile station; and transmitting the data to the mobile station through the frame, wherein the first CP and the second CP have their respective lengths different from each other.

To achieve these objects and other advantages and in accordance with the purpose of the invention, according to still another aspect of the present invention, in a mobile station receiving data by using a frame including a first subframe in which a physical downlink shared channel (hereinafter, referred to as "PDSCH") includes a first cyclic prefix (hereinafter, referred to as "CP") and a second subframe in which the PDSCH includes a second CP, the mobile station comprises a receiving module receiving information on the length of the first CP from a base station and receiving the data from the base station through the first subframe; and a processor removing a CP of the data using the information on the length of the first CP, wherein the first CP and the second CP have their respective lengths different from each other.

To achieve these objects and other advantages and in accordance with the purpose of the invention, according to further still another aspect of the present invention, in a base station for transmitting data by using a frame including a first subframe in which a physical downlink shared channel (hereinafter, referred to as "PDSCH") includes a first cyclic prefix (hereinafter, referred to as "CP") and a second subframe in which the PDSCH includes a second CP, the base station comprises a transmitting module transmitting information on the length of the CP of the frame to a mobile station and transmitting the data to the mobile station through the frame; and a processor allocating the subframes of the frame to the mobile station, wherein the first CP and the second CP have their respective lengths different from each other.

Advantageous Effects

According to the embodiments of the present invention, subframes in one frame use different CP lengths, whereby resources can be used efficiently.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on that a mobile communication system is a 3GPP2 802.16 system, the following description may be applied to another random mobile communication system excluding particular features of the 3GPP2 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a mobile terminal will refer to a mobile or fixed type user terminal device such as a user equipment (UE) and a mobile station (MS). Also, it is assumed that a base station will refer to a random node of a network terminal that performs communication with a mobile station, such as Node B (NB) and eNode B (eNB).

Figure 2:
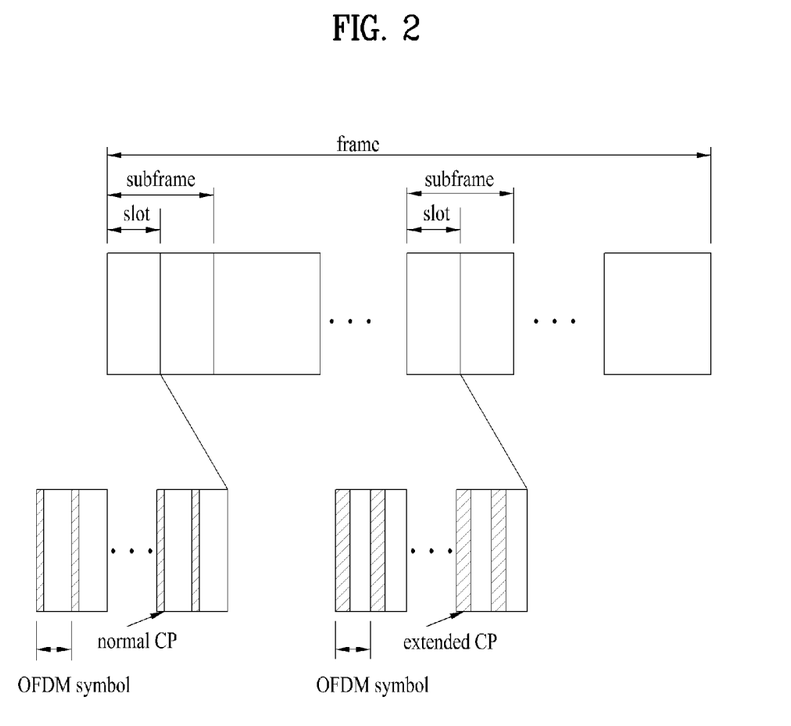
FIG. 2 is a diagram illustrating a frame structure according to the embodiment of the present invention.

First of all, a frame structure according to the embodiment of the present invention will be described with reference to FIG. 2. FIG. 2 is a diagram illustrating a frame structure according to the embodiment of the present invention.

As shown in FIG. 2, subframes of a frame according to the embodiment of the present invention may have their respective CP lengths different from one another. In other words, the frame according to the embodiment of the present invention may include a first subframe having a normal CP and a second subframe having an extended CP. Although two CP lengths will be described in the embodiment of the present invention, the present invention is not limited to the two CP lengths.

The subframe includes a physical downlink control channel (hereinafter, referred to as "PDCCH) carrying control information, and a physical downlink shared channel (hereinafter, referred to as "PDSCH") carrying data.

If two types of CP lengths are used in the system, each of the subframes may have four types of CP lengths. In other words, there may be provided the case where the PDCCH may have an extended CP while the PDSCH may have a normal CP, the case where the PDCCH may have a normal CP while the PDSCH may have an extended CP, the case where both the PDCCH and the PDSCH may have an extended CP, and the case where both the PDCCH and the PDSCH may have a normal CP.

CP lengths may be varied in PDSCH regions of subframes depending on the subframes, whereas one CP length may be applied to PDCCH regions in all the subframes. For example, in a large cell, the PDCCH may have an extended CP for all the subframes. This is to allow even a mobile station having great delay spread due to a long distance from the base station to successfully decode the PDCCH, wherein the PDCCH should be decoded by all the mobile stations.

The base station notifies the mobile station of a CP length of each subframe. If the PDCCHs of all the subframes in the frame have the same CP length, the base station notifies the mobile station of the CP length only of the PDSCH.

A frame structure as to what subframe has a normal CP and what subframe has an extended CP may be determined per cell or may be determined by the base station depending on the status.

The base station allocates a subframe having a long CP to a mobile station having great delay spread, and allocates a subframe having short CP to a mobile station having small delay spread.

Next, a method for transmitting data from a base station to a mobile station by using the frame structure according to the embodiment of the present invention will be described.

Figure 3:
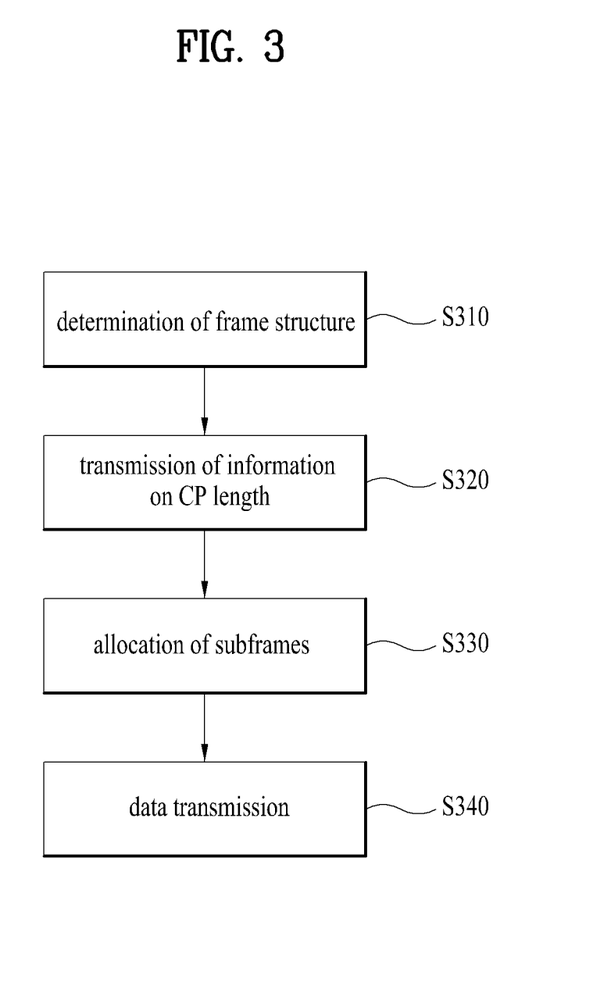
FIG. 3 is a flow chart illustrating a method for transmitting data in accordance with the embodiment of the present invention.

FIG. 3 is a flow chart illustrating a method for transmitting data in accordance with the embodiment of the present invention.

As shown in FIG. 3, the base station determines a frame structure as to what subframe has a normal CP and what subframe has an extended CP (S310). The base station may previously determine the frame structure, or may determine the frame structure depending on the status. If the frame structure is determined previously, the base station does not perform the step S310.

If the frame structure is determined depending on the status, the base station may determine the frame structure considering delay spread of the mobile stations. In other words, in case of a mobile station having great delay spread, more subframes having an extended CP may be arranged in the frame. In case of a mobile station having small delay spread, more subframes having a normal CP may be arranged in the frame.

The base station transmits information on a CP length to the mobile station (S320).

At this time, the base station may transmit the information on a CP length to the mobile station through the PDCCH, a radio frame header or radio resource control (RRC) signaling.

If the information on a CP length is transmitted through the PDCCH, the base station transmits information on a CP length of the PDSCH of the subframe to which the corresponding PDCCH belongs, through the corresponding PDCCH.

In this case, the CP length of the PDCCH may equally be applied to all the subframes. In other words, since the same CP length is applied to all the subframes, the base station may previously notify the mobile station of the CP length of the PDCCH, and may previously notify the mobile station of the CP length of the PDSCH of each of the subframes through the corresponding PDCCH.

At this time, the information on the CP length of the PDSCH may be expressed as a CP length indicator. For example, it is assumed that there are provided two CP lengths. In this case, the CP length indicator may be set to 1 if the normal CP is used, and the CP length indicator may be set to 0 if the extended CP is used. Also, the CP length indicator may be represented by 1 bit if there are provided two types of CP lengths, and the CP length indicator may be represented by 2 bits if there are provided three types of CP lengths.

If the information on the CP length is transmitted through the radio frame header, the base station transmits the information on the CP length of subframes belonging to the corresponding frame, through the radio frame header. For example, if there are provided two types of CP lengths, the base station may notify the mobile station of a subframe that uses the extended CP. Then, the mobile station may identify that the other subframes use the normal CP.

If the base station uses one frame structure for a long time, it may notify the mobile station of the information on the CP length through RRC signaling.

The base station allocates the subframes to the mobile stations (S330). At this time, the base station may allocate the subframe having the extended CP to the mobile station having great delay spread, and may allocate the subframe having the normal CP to the mobile station having small delay spread.

The base station transmits data to the mobile stations through the allocated subframes (S340).

Figure 4:
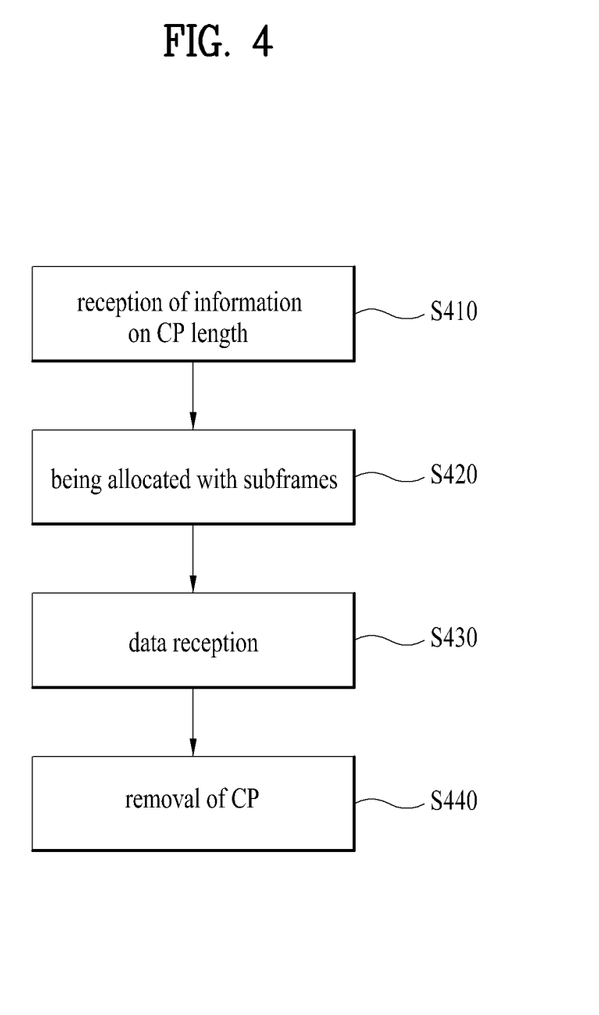
FIG. 4 is a diagram illustrating a method for receiving data in accordance with the embodiment of the present invention.

Next, a method for receiving data in accordance with the embodiment of the present invention will be described with reference to FIG. 4. FIG. 4 is a diagram illustrating a method for receiving data in accordance with the embodiment of the present invention.

As shown in FIG. 4, the mobile station receives the information on the CP length (S410).

At this time, the mobile station may receive the information on the CP length from the base station through the PDCCH, the radio frame header or RRC signaling.

Afterwards, the mobile station is allocated the subframes (S420), and receives data through the allocated subframes (S430). At this time, if delay spread of the mobile station is great, the mobile station is allocated the subframe having the extended CP. If delay spread of the mobile station is small, the mobile station is allocated the subframe having the normal CP.

The mobile station removes the CP of the received data by using the received information on the CP length (S440).

Although a downlink has been described in the embodiment of the present invention, the present invention may be applied to a frame of an uplink. In other words, the uplink frame may include subframes having different CP lengths of a physical uplink shared channel (hereinafter, referred to as "PUSCH"). The base station may allocate a subframe having a long cyclic prefix length or a subframe having a short cyclic prefix length to the mobile station or mobile station group. The base station may notify the mobile station of information on the cyclic prefix length through RRC signaling or a physical uplink control channel (hereinafter, referred to as "PUCCH").

Otherwise, the base station may configure a frame to use different cyclic prefix lengths depending on an uplink subframe. In this case, all the mobile stations located in the corresponding cell transmit a signal by varying cyclic prefix lengths depending on the location of the uplink subframe. In other words, the mobile stations transmit a signal by using the corresponding cyclic prefix length depending on the subframe index. In this way, if the frame is configured to use different cyclic prefix lengths depending on the uplink subframe, index of the subframe having the same CP length may be set to become a multiple of 4. Namely, if the cyclic prefix length of the nth subframe is K, the cyclic prefix length of the (n+4)th subframe may also be set to become K. This is because that it is efficient to set the index of the subframes having the same cyclic prefix length to a multiple of 4 as retransmission is performed at a period of four subframes.

Figure 5:
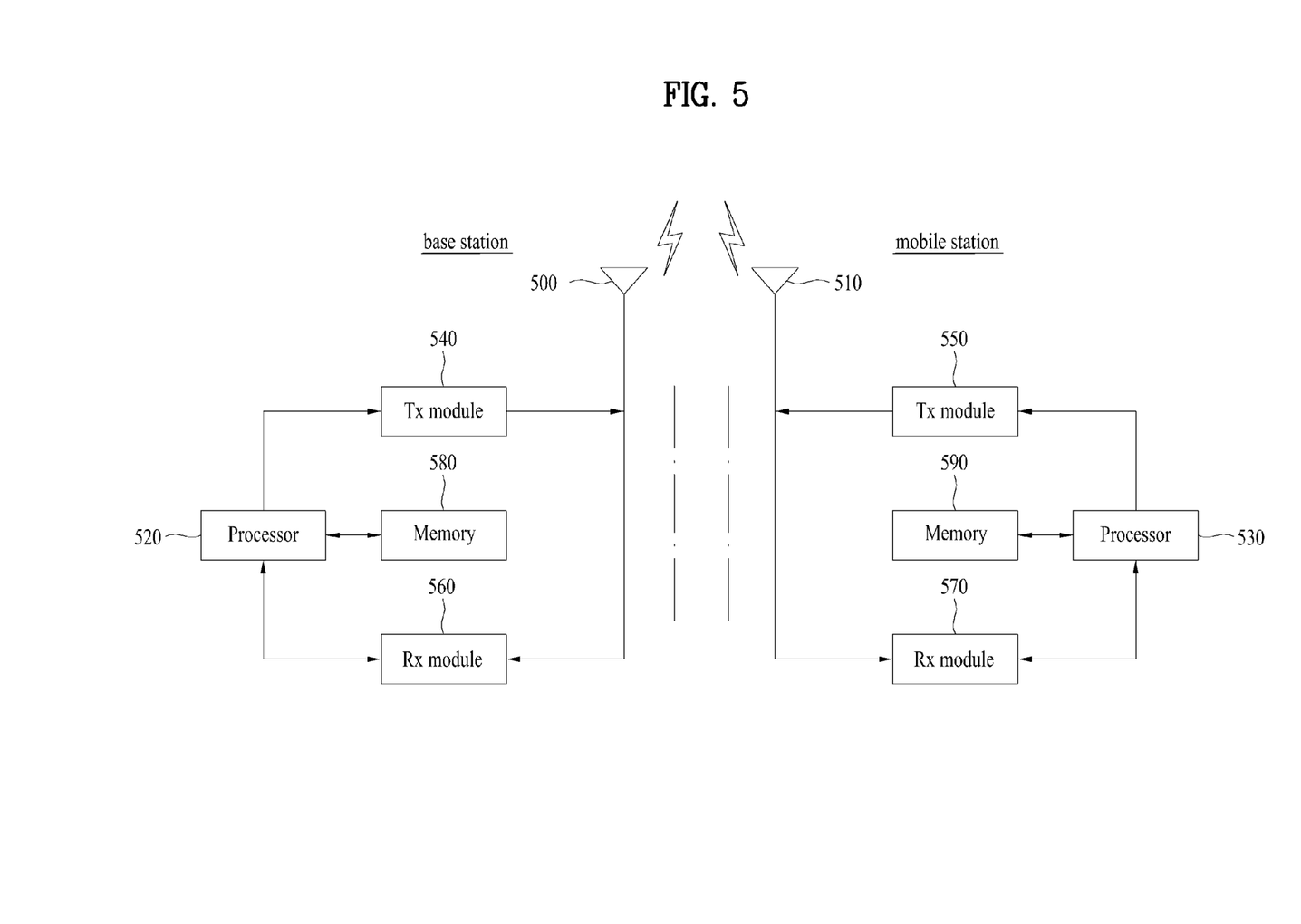
FIG. 5 is a diagram illustrating a configuration of a mobile station and a base station, in which the embodiments of the present invention can be carried out, in accordance with another embodiment of the present invention.

FIG. 5 is a diagram illustrating a configuration of a mobile station and a base station, in which the embodiments of the present invention can be carried out, in accordance with another embodiment of the present invention.

Each of the mobile station (AMS) and the base station (ABS) includes an antenna 500, 510 transmitting and receiving information, data, signal and/or message, a Tx module 540, 550 transmitting a message by controlling the antenna, an Rx module 560, 570 receiving a message by controlling the antenna, a memory 580, 590 storing information related to communication with the base station, and a processor 520, 530 controlling the Tx module, the Rx module, and the memory. At this time, the base station may be a femto base station or a macro base station.

The antenna 500, 510 serves to transmit a signal generated by the Tx module 540, 550 to the outside or receive a radio signal from the outside to transfer the radio signal to the Rx module 560, 570. If a MIMO antenna function is supported, two or more antennas may be provided.

The processor 520, 530 generally controls the whole operation of the mobile station or the base station. Particularly, the processor may perform a controller function for performing the aforementioned embodiments of the present invention, a medium access control (MAC) frame variable control function based on service characteristics and propagation condition, a handover function, an authentication and encryption function, etc. Also, the processor 520, 530 may further include an encryption module for controlling encryption of various messages and a timer module controlling transmission and reception of various messages.

The Tx module 540, 550 may perform predetermined coding and modulation for signal and/or data, which are scheduled from the processor and then transmitted to the outside, and then may transfer the coded and modulated data to the antenna 500, 510.

The Rx module 560, 570 may perform decoding and demodulation for the radio signal received from the outside through the antenna 500, 510 to recover the original data and then transfer the recovered data to the processor 520, 530.

The memory 580, 590 may store a program for processing and control of the processor, or may perform a function for temporarily storing input/output data (in case of the mobile station, UL grant allocated from the base station, system information, station identifier (STID), flow identifier (FID), action time, zone allocation information, and frame offset information).

Also, the memory may include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for receiving data at a mobile station (MS) in a wireless communication system, the method comprising:
receiving information indicating a subframe index, the subframe indicated by the subframe index including one or more OFDM (Orthogonal Frequency Division Multiplexing) symbols using extended CP (Cyclic Prefix); and
transmitting uplink data in a uplink subframe by consideration of the subframe index,
wherein, if the uplink subframe is the subframe indicated by the subframe index, one or more uplink subframes in which the uplink data is re-transmitted include one or more OFDM symbols using the extended CP, and
wherein, if the uplink subframe is not the subframe indicated by the subframe index, one or more uplink subframes in which the uplink data is re-transmitted include one or more OFDM symbols using normal CP.

2. The method according to claim 1, further comprising:
removing the extended CP from the one or more OFDM symbols if the uplink subframe is the subframe indicated by the subframe index; and
removing the normal CP from the one or more OFDM symbols if the uplink subframe is not the subframe indicated by the subframe index.

3. A method for transmitting data from a base station (BS) in a wireless communication system, the method comprising:
configuring a frame including a plurality of subframes, each subframe using a different CP (Cyclic Prefix);
transmitting information indicating a subframe index, the subframe indicated by the subframe index including one or more OFDM (Orthogonal Frequency Division Multiplexing) symbols using extended CP (Cyclic Prefix);
receiving uplink data in a uplink subframe by consideration of the subframe index,
wherein, if the uplink subframe is the subframe indicated by the subframe index, one or more uplink subframes in which the uplink data is re-transmitted include one or more OFDM symbols using the extended CP, and
wherein, if the uplink subframe is not the subframe indicated by the subframe index, one or more uplink subframes in which the uplink data is re-transmitted include one or more OFDM symbols using normal CP.

4. A mobile station receiving data in a wireless communication system, the mobile station comprising:
a Radio Frequency (RF) module; and
a processor controlling the RF module,
wherein the processor is configured to:
receive information indicating a subframe index, the subframe indicated by the subframe index including one or more OFDM (Orthogonal Frequency Division Multiplexing) symbols using extended CP (Cyclic Prefix), and
transmit uplink data in a uplink subframe by consideration of the subframe index,
wherein, if the uplink subframe is the subframe indicated by the subframe index, one or more uplink subframes in which the uplink data is re-transmitted include one or more OFDM symbols using the extended CP, and
wherein, if the uplink subframe is not the subframe indicated by the subframe index, one or more uplink subframes in which the uplink data is re-transmitted include one or more OFDM symbols using normal CP.

5. The mobile station according to claim 4, wherein the processor is further configured to:
remove the extended CP from the one or more OFDM symbols if the uplink subframe is the subframe indicated by the subframe index; and
remove the normal CP from the one or more OFDM symbols if the uplink subframe is not the subframe indicated by the subframe index.

6. A base station for transmitting data in a wireless communication system, the base station comprising:
a Radio Frequency (RF) module; and
a processor controlling the RF module,
wherein the processor is configured to:
configure a frame including a plurality of subframes, each subframe using each different CP (Cyclic Prefix) to transmit information indicating a subframe index, the subframe indicated by the subframe index including one or more OFDM (Orthogonal Frequency Division Multiplexing) symbols using extended CP (Cyclic Prefix), and
receive uplink data in a uplink subframe by consideration of the subframe index, wherein, if the uplink subframe is the subframe indicated by the subframe index, one or more uplink subframes in which the uplink data is re-transmitted include one or more OFDM symbols using the extended CP, and wherein, if the uplink subframe is not the subframe indicated by the subframe index, one or more uplink subframes in which the uplink data is re-transmitted include one or more OFDM symbols using normal CP.

* * * * *